United States Patent [19]

Gagnon

[11] Patent Number: 5,400,144
[45] Date of Patent: Mar. 21, 1995

[54] METHOD AND APPARATUS FOR REMOTE DETECTION AND THICKNESS MEASUREMENT OF ICE OR LIQUID LAYER

[76] Inventor: Robert E. Gagnon, 19A Allan Square, St. John's, Newfoundland, Canada, A1C 4A9

[21] Appl. No.: 187,061

[22] Filed: Jan. 27, 1994

[51] Int. Cl.$^6$ .............................................. G01B 11/06
[52] U.S. Cl. .................................... 356/382; 340/583
[58] Field of Search ............... 356/381, 382; 340/583; 250/561, 341

[56] References Cited

U.S. PATENT DOCUMENTS

| | | | |
|---|---|---|---|
| 5,180,122 | 1/1993 | Christian et al. | 340/583 |
| 5,243,185 | 9/1993 | Blackwood | 250/225 |

FOREIGN PATENT DOCUMENTS 266404  11/1987  Japan .................................. 356/382

*Primary Examiner*—F. L. Evans
*Attorney, Agent, or Firm*—Juliusz Szereszewski

[57] ABSTRACT

There is described a method and apparatus for detection and thickness evaluation of a buildup of ice or liquid on a solid surface, especially on a body of an aircraft. The apparatus comprises a source of a narrow beam of radiation and a means for remote evaluation of the size of a luminous area created on the solid surface by the beam. The method of the invention involves measuring the size of the luminous area and determining the thickness of any built-up layer, if sufficiently transparent, using a formula which uses the dependency of the size of the luminous are on the thickness of the layer and the refraction index of the medium. Differentiation between ice and a liquid is possible by evaluating regularity of illumination of the luminous area.

10 Claims, 1 Drawing Sheet

METHOD AND APPARATUS FOR REMOTE DETECTION AND THICKNESS MEASUREMENT OF ICE OR LIQUID LAYER

FIELD OF THE INVENTION

This invention relates to a device and related method for remote detection and measurement of thickness of ice or liquid layers on a solid surface, for instance for thickness measurement of an ice layer with some degree of transparency on the surface of an aircraft.

BACKGROUND OF THE INVENTION

It has been found quite important, since the advent of air transportation in cold climate, to evaluate and control icing on the surface of a flying vehicle. It is essential to be able to determine not only the presence and thickness of an ice layer; it is also important to be able to distinguish, from a distance, between ice, de-icing liquid, snow, and water presence on the surface in question.

Among known techniques for ice thickness measurement, a distinction can be made between remote and non-remote measurements. Electrical, acoustic, mechanical and optical devices have been proposed to date for this purpose.

In French Patent No. 2618543 issued to Clerc, a surface analyzer for a motor vehicle is described as having electromagnetic emitters whose signals are reflected from road surface for processing by means of receivers and a processing unit so as to determine the state of the road surface.

European Patent Application No. 461,953 proposes another device for examining road surface, including a laser that emits a light beam towards the surface. The reflected light is collected by a detector which generates signals analyzed by a microprocessor. The device is attached to a vehicle. The source is controlled by a circuit so that the beam spot on the road surface is immobile relative to the surface for a certain length of time. The device is useful to differentiate between ice, water and snow.

A device based on the degree of absorption of infrared radiation for detection and thickness measurement of ice is described in U.S. Pat. No. 4,808,824. The reflective and absorptive qualities of ice in the infrared region can also be used to detect ice and measure the thickness according to DE Patent 4008280.

Other optical/electrical methods and devices for ice evaluation on the road surface or other surfaces are described in U.S. Pat. No. 5,218,206 (Schmitt et al.), EP application No. 405,625 (Federow), U.S. Pat. No. 5,014,042 (Michoud) and U.S. Pat. No. 4,690,553 to Fumizu et al.

There is still a need for a simple and reliable method and device for remote, non-contact detection and thickness measurement of ice.

SUMMARY OF THE INVENTION

According to one aspect of the invention, an apparatus is provided for remote detection and thickness evaluation of a substantially transparent layer of ice or a liquid on a substantially smooth solid surface, the apparatus comprising:
a source of electromagnetic radiation for emitting a narrow beam of radiation towards the surface to be examined in a manner to create, in the presence of an ice layer or a liquid layer on the surface, a luminous multi-zone area on the surface, and
a remote detecting means for determining the size of the luminous multi-zone area as a function of the thickness of the ice or liquid layer.

The source of electromagnetic radiation may be provided with means for "moving" the radiation beam over the examined surface in order, for example, to determine the ice buildup at various areas or to enable the differentiation between ice and liquid. Alternatively, the direction of the beam can be changed manually, by adjusting the position of the source of radiation.

According to a second aspect of the invention, there is provided a method of remote non-contact detection and thickness evaluation of a substantially transparent layer of ice or a liquid on a substantially smooth solid surface, comprising the steps of:
directing a narrow beam of electromagnetic radiation onto the layer of ice or liquid in a manner to create on the surface, in the presence of such layer, a luminous area having at least two zones, including a bright centre zone and a darker second Zone,
measuring the size or diameter D of the luminous area, and
determining the thickness H of the ice or liquid layer from the size or diameter of the luminous area by way of the formula $$H = D/4 \tan \alpha$$

where $$\alpha = \sin^{-1}(1/n)$$

n being the refractive index of ice or liquid.

According to a third aspect of the invention, a method for remote non-contact detection and optional thickness evaluation of a substantially transparent layer of ice or liquid on a substantially smooth solid surface, comprising the steps of:
directing a narrow beam of electromagnetic radiation onto the layer of ice in a manner to create on the surface, in the presence of such layer, a luminous area having at least two zones, including a bright centre zone and a darker second zone, and
determining whether the layer is a liquid or ice by evaluating the regularity of illumination of said at least one zone.

The determination can be achieved by observation of the zones without moving the luminous area relative to the solid surface, or by varying (sweeping) the direction of the beam relative to the solid surface thereby enhancing the distinctiveness of any irregularities in the illumination of the zone or zones.

Following the determination of the medium, the thickness of the respective layer can be evaluated, or measured, as described above in the second aspect of the invention.

In the case of ice or water layer thickness measurement, the source of electromagnetic radiation is preferably a laser, the wavelength of the laser beam being below approximately 1 micron, to avoid the range of frequency where ice exhibits strong absorption. A helium neon laser with a wavelength of 633 nm (red) or a cadmium vapour laser are examples of the radiation source.

DETAILED DESCRIPTION OF THE INVENTION

As mentioned hereinabove, the invention can be realized by using a laser beam or any visible wavelength or infrared laser with a wavelength outside of the region where ice and water strongly absorb (i.e. not greater than 1 micron). A suitable wavelength should be selected for other liquids (deicing fluids) such that the liquid is not strongly absorbent for that wavelength.

Due to dispersion, the refractive indexes of ice and water change slightly in going from visible to infrared wavelengths. The exact values corresponding to the wavelengths used are readily available in the literature and handbooks.

In tests conducted to validate the invention, a helium-neon laser with wavelength of 633 nm (red) and a cadmium vapour laser (violet, 442 nm) were used and found effective for ice thickness determination. The laser beam is preferable because of the facility of obtaining a narrow beam at considerable distances, but any other source of radiation within the above-defined wavelength limits and capable of producing a narrow beam of radiation is acceptable.

Figure 1:
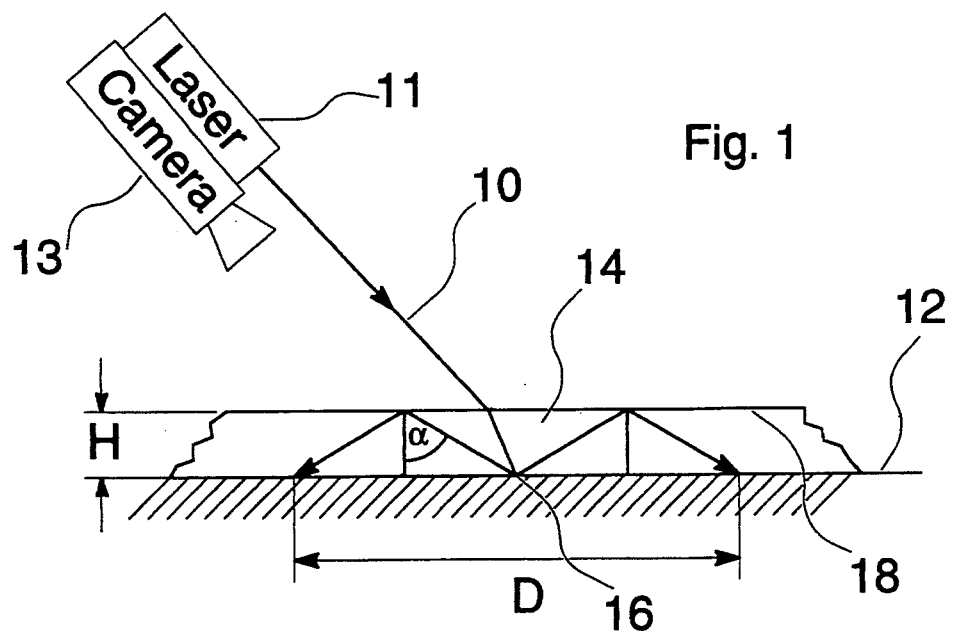
FIG. 1 is a schematic illustration of the passage of incident and reflected radiation versus an ice-covered surface.

As illustrated in FIG. 1, a laser 11 beam 10 from a laser, is directed towards the surface 12 on which a layer 14 of ice is present. The angle of incidence, i.e. the angle between the beam and a line normal to the surface, is not important and can be quite large. The beam 10 traverses the ice layer 14 and impinges on the surface producing thereby an intense bright spot 16 (FIG. 2) from which light scatters in all directions. All of the light scattered from the spot and striking the ice/air interface 18 at an angle of incidence less than a certain angle $\alpha$ passes through the interface 18. The rays incident at angles greater than $\alpha$ become internally reflected from the ice/air interface 18 to strike and illuminate the surface 12 again.

Figure 2:
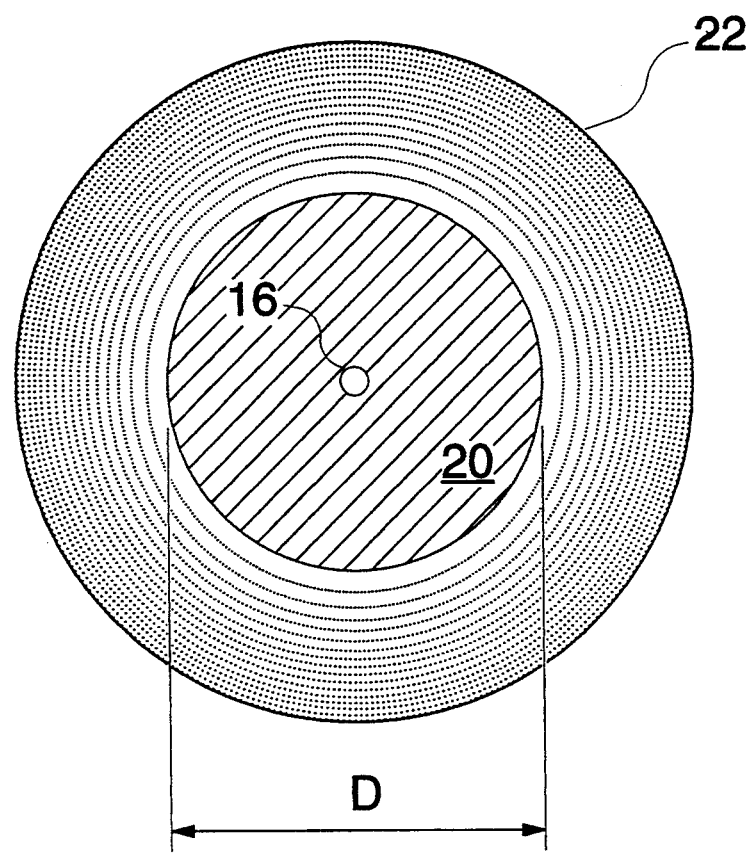
FIG. 2 is a top view of a luminous area obtained on the surface upon its illumination with a narrow beam of radiation according to the invention.

Consequently, as shown in FIG. 2, the bright spot 16 where the laser light first hits the surface 12 is surrounded by a dark circular (or ellipsoidal) zone 20 having a perimeter, or diameter, D which is defined by a brighter zone 22. The brightness of the zone 22 diminishes with its distance from the center (the bright spot 16).

The view of the surface 12 from angles other than normal will show an ellipsoidal luminous area rather than a circle. For the purpose of ice thickness determination, the actual (largest) diameter of the dark zone 20 will be determined.

The angle $\alpha$ is a function of only the refractive index n of ice, specifically 1,312. According to the simple geometry of the layout shown in FIG. 1, the thickness H of the ice is given by the formula $$H = D/4 \tan \alpha$$

where $$\alpha = \sin^{-1}(1/n)$$

For ice, $\alpha$ is approximately 50°.

To remotely view the spot where the laser beam strikes the surface 12, and to measure the diameter of the dark zone, or the interface between the dark zone 20 and the brighter zone 22, a video camera 13 with a telephoto lens, is used. Ordinary CCD video cameras are sensitive to infrared radiation in the range specified above, if an infrared laser radiation is used rather than a visible laser light source. The camera can be positioned at the same location as the laser or at some other site. The diameter of the bright circle can be measured directly off a video monitor.

The distance from the surface at which measurements can be made depends on the power of the telephoto lens on the video camera. Using a standard camcorder with a 10 X zoom lens accurate measurements of ice thickness, in the range 0–12 mm were made at a distance of 2.2 m from the surface. The absolute accuracy of the measurements was $+/-0.1$ mm.

For the accuracy of measurement it is important that the diameter of the laser beam be as narrow as possible. This affects the sharpness of the dark zone 20/brighter zone 22 interface from which ice thickness measurements are derived. A beam less than, or equal to, 1 mm in diameter yields a sharp transition from dark zone 20 to brighter zone 22. The distinctiveness of the zone transition diminishes as the beam diameter increases. Meaningful measurements are still obtainable for thick layers of ice or liquid when the beam is several millimeters in diameter, but with diminished accuracy. Some lasers have very narrow beams and others have more divergent ones. A long focal length lens can be used in the path of the laser beam to ensure that the beam diameter is small when it strikes the surface.

The visibility of the brighter zone 22 can be enhanced by using an optical filter of a wavelength similar to the laser wavelength and/or increasing the intensity of the laser beam.

Using a powerful telephoto lens (>50X) on the viewing device and a laser with a small beam divergence, or a laser in conjunction with a long focal length lens, accurate thickness measurements can be made at distances much greater than that demonstrated above.

For very thin ice, i.e. less than 500 microns, the perimeter of the dark zone/brighter zone interface is smaller than the bright laser spot 16 itself and cannot be measured. However, in such a situation, the outermost brighter zone 22 of the luminous area becomes more concentrated. Consequently, the outside diameter of the brighter zone 22 comprised of the rays of light that get internally reflected at angles more than $\alpha$ can be measured and the ice thickness can be estimated correspondingly.

The measurement of ice thickness according to the above-described method is limited to layers which are substantially transparent to a degree enabling the transmission of a radiation beam. If the surface carrying the ice layer is not substantially flat, then the curvature of the surface must be predetermined and taken into account in the ice thickness determination.

The method and apparatus of the invention are equally adaptable to the thickness measurements of liquid layers on solid and at least partially reflective surfaces. The luminous area created by the passage of the laser beam, or another radiation beam, through a liquid is analogous to that created by a layer of ice subject to the refractive index of the liquid. Obviously, the thickness of a liquid layer on a substantially flat or convex solid surface, common for a body of an aeroplane, is usually strictly limited by the adhesive forces which calls for a narrow beam of radiation.

If the layer is not uniformly thick and the non-uniformity is in the order of the size of the brighter zone 22, then the shape of the spot will not be circular and can be analyzed to give information about the non-uniformity of the thickness. If the non-uniformities are small in comparison with the size of the illuminated zone, then a distinctive circular area is still visible and measurable. Hence, even layers of ice with a degree of bumpiness or waviness can be measured.

The method and apparatus of the invention can be used to determine the thickness of ice or liquid layers in various environments, e.g. in or on an industrial apparatus, in a marine environment etc.

The method of the invention can be used to determine the type of medium being measured, i.e. ice or liquid. If the layer is liquid, the bright zone 22 is perfectly regular with diminishing intensity as the radius increases. If the layer is natural ice, its interior will have inherent irregularities such as grain boundaries and small air bubbles. Surface irregularities will also be present. If very fine surface irregularities are present, they will give the ice a frosty texture whereas larger irregularities will make the surface bumpy. Whatever the nature of the irregularities of the ice they will have shadowing and reflective effects which result in a distinct disruption of the appearance of the zone 22 from its appearance when the medium is liquid. While maintaining the overall circular shape at the interface with zone 20, the zone 22 will have disturbances (i.e. brighter and darker areas) in the intensity of the illumination, resulting from the irregularities. The border of zone 20 and zone 22 will be somewhat fuzzy if the ice surface has a frosty texture. The distinctiveness of the irregularities in zone 22 can be enhanced by moving the laser beam around slightly. This causes relatively large movements of the irregularities in illumination. Moving the laser beam also enhances the general distinctiveness of zone 20 and zone 22 when the ice layer transparency is significantly compromised by imperfections in the ice. The moving can be done manually or commonly known means can be used for that purpose.

Hence, irregularities in the intensity of illumination of zone 22 and/or reduction in sharpness at the interface of zone 20 and 22 compared to its known sharpness for liquid layers indicate that the medium is ice. In this regard, the method can be used as an ice detector whether or not thickness measurements are required.

It is possible to use the apparatus and method of the present invention to evaluate the thickness of the ice layer on a moving surface. The shutter speed of the video camera (or other detecting means) can be adjusted so that sharp video frames of the luminous area circle are recorded. The diameter of the luminous area (the darker zone) can be measured during still frame playback. In cases where objects with the ice layer are moving quickly and periodically through the same space, e.g. propellers, wind turbines, fans etc., they have the appearance of being stationary and the method and apparatus of the invention can operate in the same manner as on stationary objects, without using still frame playback and without compromising the accuracy of the measurement.

It is an advantage of the method of the invention to enable an accurate remote non-contact detection and thickness measurement of ice layers.

It is another advantage of the invention to enable the measurement of ice layers ranging from very thin layers to several centimeters, if substantially transparent.

It is still another advantage of the invention to enable the measurement of ice thickness over an entire surface of interest, the surface not necessitating any modifications.

I claim:

1. An apparatus for remote thickness evaluation of a substantially transparent layer of ice or a liquid on a substantially smooth surface, the apparatus comprising:
   a source of electromagnetic radiation for emitting a narrow beam of radiation towards the surface to be examined in a manner to create, in the presence of an ice layer or a liquid layer on the surface, a luminous multi-zone area on the surface, and
   a remote detecting means for determining the size of the luminous multi-zone area as a function of the thickness of the ice layer or the liquid layer.

2. The apparatus of claim 1 wherein the source of electromagnetic radiation is a laser.

3. The apparatus according to claim 1 where the wavelength of the radiation is below 1 micron.

4. The apparatus according to claim 1 wherein the detecting means are a video camera with a telephoto lens.

5. A method of remote non-contact thickness evaluation of a substantially transparent layer of ice or a liquid on a substantially smooth surface, comprising the steps of:
   directing a narrow beam of electromagnetic radiation onto the layer of ice or liquid in a manner to create on the surface a luminous multi-zone area,
   measuring the size or diameter D of the luminous area, and
   determining the thickness H of the layer of ice or liquid from the size or diameter D of the luminous area by way of the formula $$H = D/4 \tan \alpha$$

where $$\alpha = \sin^{-1}(1/n)$$

n being the refractive index of ice or of the liquid.

6. The method according to claim 5 wherein the beam of radiation is directed onto the layer in a manner to create on the surface a luminous multi-zone area having at least two zones, a bright centre zone and a darker second zone, wherein D is the size or diameter of the darker second zone.

7. A method of remote non-contact detection and optional thickness evaluation of a substantially transparent layer of ice or liquid on a substantially smooth solid surface, comprising the steps of:
   directing a narrow beam of electromagnetic radiation onto the layer of ice or a liquid in a manner to create on the surface, in the presence of such layer, a luminous area having at least two zones, including a bright centre zone and a darker second zone, and
   determining whether the layer is a liquid or ice by evaluating the regularity of illumination of at least one of said zones.

8. The method according to claim 7, further comprising the steps of
measuring the size or diameter D of the luminous area, and
determining the thickness H of the layer of ice or liquid from the size or diameter D of the luminous area by way of the formula $$H = D/4 \tan \alpha$$

where $$\alpha = \sin^{-1}(1/n)$$

n being the refractive index of ice or of the liquid.

9. The method according to claim 7, wherein D is the size or diameter of the darker second zone.

10. The method according to claim 7 further comprising the step of varying the direction of the beam relative to the solid surface in a manner to enhance the distinctiveness of any irregularities in the illumination of at least one of said zones.

* * * * *